United States Patent
Centonza et al.

(10) Patent No.: US 11,659,520 B2
(45) Date of Patent: May 23, 2023

(54) METHOD AND APPARATUS FOR PAGING A USER EQUIPMENT IN AN AREA SPANNING ACROSS A PLURALITY OF RADIO ACCESS TECHNOLOGIES

(71) Applicant: Telefonaktiebolaget LM Ericsson (publ), Stockholm (SE)

(72) Inventors: Angelo Centonza, Stockholm (SE); Gunnar Mildh, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/495,685

(22) PCT Filed: Mar. 20, 2018

(86) PCT No.: PCT/SE2018/050285
§ 371 (c)(1),
(2) Date: Sep. 19, 2019

(87) PCT Pub. No.: WO2018/174795
PCT Pub. Date: Sep. 27, 2018

(65) Prior Publication Data
US 2020/0029304 A1 Jan. 23, 2020

Related U.S. Application Data

(60) Provisional application No. 62/474,262, filed on Mar. 21, 2017.

(51) Int. Cl.
*H04W 68/12* (2009.01)
*H04W 8/24* (2009.01)
*H04W 88/06* (2009.01)

(52) U.S. Cl.
CPC ............. *H04W 68/12* (2013.01); *H04W 8/24* (2013.01); *H04W 88/06* (2013.01)

(58) Field of Classification Search
CPC ..... H04W 68/00; H04W 76/18; H04W 48/12; H04W 8/08; H04W 80/02; H04W 48/10;
(Continued)

(56) References Cited

U.S. PATENT DOCUMENTS 10,117,219 B2 * 10/2018 Horn .................... H04W 68/005
10,595,297 B2 * 3/2020 Horn .................... H04W 68/12
(Continued)

FOREIGN PATENT DOCUMENTS

| CN | 101262624 A | * | 9/2008 |
| EP | 2844011 A1 | | 3/2015 |

(Continued)

OTHER PUBLICATIONS

Unknown, Author, "LS on Paging Optimization", 3GPP TSG RAN WG3 Meeting #87, R3-150345, Athens, Greece; 3GPP TSG SA WG2 Meeting #107, S2-150698, Sorrento, Italy, Feb. 9-13, 2015, pp. 1-2.

(Continued)

*Primary Examiner* — David Q Nguyen
(74) *Attorney, Agent, or Firm* — Sage Patent Group

(57) ABSTRACT

A method in a radio access network, RAN, node for paging user equipment in an area spanning across a plurality of radio access technologies, RATs, comprises determining the capabilities of a user equipment to which a paging message is intended, and transmitting the paging message to the UE via one or more RATs which the UE is determined as being capable of communicating with.

16 Claims, 7 Drawing Sheets

(58) Field of Classification Search
CPC ..... H04W 76/27; H04W 48/16; H04W 68/02; H04W 48/02; H04W 84/042
USPC ................ 370/331; 455/458, 426.1, 418
See application file for complete search history.

(56) References Cited

U.S. PATENT DOCUMENTS

| | | | |
|---|---|---|---|
| 11,553,365 B2* | 1/2023 | Kim | H04W 24/10 |
| 2003/0162553 A1 | 8/2003 | Huang et al. | |
| 2004/0102199 A1 | 5/2004 | Haumont | |
| 2011/0256855 A1* | 10/2011 | Wang | H04W 8/24 455/418 |
| 2015/0181473 A1* | 6/2015 | Horn | H04W 36/0027 370/331 |
| 2015/0334766 A1* | 11/2015 | Lee | H04W 56/002 455/426.1 |
| 2016/0057729 A1 | 2/2016 | Horn et al. | |
| 2016/0277991 A1* | 9/2016 | Yang | H04W 36/0083 |
| 2017/0280340 A1* | 9/2017 | Zhu | H04W 24/04 |
| 2018/0007626 A1* | 1/2018 | Tenny | H04W 48/16 |
| 2019/0191483 A1* | 6/2019 | Ryoo | H04W 12/0433 |
| 2020/0029237 A1* | 1/2020 | Kim | H04W 68/06 |
| 2021/0219238 A1* | 7/2021 | Sharma | H04W 36/0083 |
| 2021/0410216 A1* | 12/2021 | Liu | H04W 76/15 |

FOREIGN PATENT DOCUMENTS

| | | |
|---|---|---|
| WO | 2010129932 A1 | 11/2010 |
| WO | 2016156227 A1 | 10/2016 |
| WO | 2016169473 A1 | 10/2016 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, Mar. 2017, pp. 1-612.

* cited by examiner

601 — Send a paging message to a radio access network, RAN, node for forwarding to a UE, wherein the paging message comprises capability information, wherein the capability information provides an indication of the capabilities of a UE for communicating with one or more of a plurality of radio access technologies

Figure 6

701 — Signal capability information to a network node, the capability information indicating whether the UE is capable of connecting to a first RAT, second RAT, or both

Figure 7a

702 — Signal capability information to a network node, the capability information indicating which RATs of a plurality of RATs the UE is capable of connecting to

Figure 7b

METHOD AND APPARATUS FOR PAGING A USER EQUIPMENT IN AN AREA SPANNING ACROSS A PLURALITY OF RADIO ACCESS TECHNOLOGIES

TECHNICAL FIELD

The embodiments described herein relate to an apparatus and method for use with multiple Radio Access Technologies, RATs, and in particular to apparatus and methods relating to the management of paging in multiple RATs.

BACKGROUND

The further evolution of wireless communication systems aims to accommodate the continuously increasing amount of connections and traffic. Consequently, the networks experience a continuously increasing growth in the amount of signaling related to connection setup and management that poses a significant burden on the network signaling and processing capacity, and therefore needs to be kept as low as possible.

The third generation partnership project (3GPP) is currently working on standardization of Release 13 of the Long Term Evolution (LTE) concept.

An example of the architecture of a LTE system is shown in FIG. 1. The architecture of FIG. 1 includes radio access nodes (for example eNBs, Home eNBs—HeNBs, Home eNB Gateway—HeNB GW) and evolved packet core nodes (for example Mobility Management Entity/Service Gateways—MME/S-GW).

FIG. 1 shows the logical interfaces between eNBs and HeNBs (shown as the X2 interfaces) and between eNB/HeNBs and MME/S-GW (shown as the S1 interfaces). As can be seen in the example of FIG. 1 an S1 interface connects the HeNBs/eNBs to the MME/S-GW and connects the HeNBs to the HeNB GW, while an X2 interface connects peer eNBs/HeNBs, optionally via an X2 Gateway—X2 GW.

An example of a management system is shown in FIG. 2. The node elements (NE) 21 and 22, also referred to as eNodeB (or eNB), are managed by a first domain manager (DM) 23, which may also be referred to as an operation and support system (OSS). A domain manager (DM) may further be managed by a network manager (NM) 24.

FIG. 2 shows a node element (NE) 25 that comprises a Home eNB (HeNB) 25, which is managed by a second domain manager (DM) 26, which may also be referred to as a Home Node B Management System (HMS). The second domain manager (DM) 26 may further be managed by a network manager (NM) 24.

The first and second NEs 21, 22 in the example of FIG. 2 are interfaced by an X2 interface, whereas the interface between first DM 23 and second DM 26 is referred to as Itf-P2P (a peer-to-peer interface). The management system may configure the network elements, as well as receive observations associated to features in the network elements. For example, a DM can observe and configure NEs, while a NM can observe and configure DMs, as well as NEs via DMs.

By means of configuration via the DM, NM and related interfaces, functions over the X2 and S1 interfaces can be carried out in a coordinated way throughout the Radio Access Network, RAN, eventually involving the Core Network, CN, i.e. the MME and S-GWs of FIG. 1.

It is not yet specified by 3GPP if and how the LTE architecture should evolve to meet the challenges of the 5th Generation, 5G, time frame.

It can be assumed, however, that there will be evolved counterparts of the S1, X2 and Uu interfaces and that any new Radio Access Technology, RAT, would be integrated with the LTE radio interface at RAN level in a similar fashion as the way LTE Dual Connectivity is defined.

It is noted that the overall principles of the embodiments described later in the application work for both an LTE-like architecture and a new architecture, for example based on an evolution of the S1 interface.

NR is the name of the new Radio Access Technology that will, together with LTE, form the 5G RAN network. In 5G systems LTE and NR will be connected to a new core network, CN, named Next Generation CN (NGCN).

In such a system the concept of a Tracking Area (TA) already present in LTE will be maintained and a UE may be paged within one or more TAs.

The embodiments described later relate to a Tracking Area, TA, in 5G systems which may cover both LTE and NR cells, i.e. first and second Radio Access Technologies, RATs. As such, if paging is performed across the whole Tracking Area, TA, RAN nodes serving both LTE and NR within the TA may page a UE over both RATs.

In both LTE and NR a new way of paging a UE may be possible. Such new method may be referred to as RAN paging. In this case the UE is in a so called RRC Inactive State, namely the UE is in a state similar to the RRC Idle state but a UE context is active/stored in both the Radio Access Network, RAN, and the Core Network, CN. Moreover, both UP and CP connections between RAN and CN for the RRC Inactive UE are kept active. While the UE is in such state, if UP traffic is received at the serving RAN a "RAN Paging" procedure is started. This procedure implies that the serving RAN pages the UE over the air and it may forward over available interfaces to other neighbouring RAN nodes a request to page the UE. In the above case of TAs spanning across both LTE and NR, such paging request may reach RAN nodes that serve both RATs. If the serving RAN is not able to trigger a UE paging response, the RAN can request the CN to page the UE, e.g. by relaying the paging message received from the serving RAN to relevant RAN nodes in Tracking Area(s) the UE is registered in. The CN would then send Paging messages to RAN nodes within the UE's registration area, i.e. within the set of Tracking Areas, TAs, the UE is registered for.

The Paging procedure triggered by the Core Network, CN, for both LTE and NR can be described as per FIG. 3, where the Next Generation Core Network, NGCN generates a Paging message to the RAN, and where the RAN propagates such message over the air.

Thus, FIG. 3 shows an example of paging between CN (e.g. the NGCN) and RAN (e.g. gNB), whereby the RAN propagates the paging message over the air after receiving the Paging message is received from the CN.

There may be cases of UEs that have the capability of connecting to both LTE and NR Radio Access Technologies, RATs, but that, for example due to subscription reasons, may be allowed to connect only to one of such RATs. At the same time there might be UEs that are registered with the Next Generation Core Network, NGCN, to which both LTE and NR RAN nodes may connect, but that are only capable of connecting to one of such RATs.

For these situations where a UE is either allowed or capable to connect to only one of the RATs, e.g. to only one of the NR and LTE RATs, paging in Tracking Areas, TAs, that cover both LTE and NR may result in a waste of radio resources.

In fact, if a Tracking Area, TA, including both LTE and NR radio access is part of the UE Registration Area (RA), and if a paging message for the UE is forwarded to all RAN nodes within such a TA, then it may be possible that the Paging message is sent over the air for both the NR and LTE radio accesses, which is a waste of radio resources if a UE is only able to connect to one RAT.

SUMMARY

It is an aim of the present embodiments to provide a method and apparatus which obviate or reduce at least one or more of the disadvantages mentioned above.

According to a first aspect there is provided a method in a radio access network, RAN, node for paging user equipment in an area spanning across a plurality of radio access technologies, RATs. The method comprises determining the capabilities of a user equipment to which a paging message is intended. The method comprises transmitting the paging message to the UE via one or more RATs which the UE is determined as being capable of communicating with.

According to another aspect, there is provided a method in a core network node for paging user equipment in an area spanning across a plurality of radio access technologies. The method comprises sending a paging message to a radio access network, RAN, node for forwarding to a UE, wherein the paging message comprises capability information, wherein the capability information provides an indication of the capabilities of a UE for communicating with one or more of the plurality of radio access technologies.

According to another aspect, there is provided a method in a user equipment, UE, for enabling the UE to be paged via an area spanning across first and second radio access technologies, RATs. The method comprises signalling capability information to a network node, the capability information indicating whether the UE is capable of connecting to the first RAT, second RAT, or both.

According to another aspect, there is provided a radio access network, RAN, node for paging user equipment in an area spanning across a plurality of radio access technologies, RATs. The RAN node comprises a processor and a memory, said memory containing instructions executable by said processor. The RAN node is operative to: determine the capabilities of a user equipment to which a paging message is intended; and transmit the paging message to the UE via one or more RATs which the UE is determined as being capable of communicating with.

According to another aspect, there is provided a radio access network, RAN, node for paging user equipment in a tracking area spanning across a plurality of radio access technologies, RATs. The RAN node comprises a processor and a memory, said memory containing instructions executable by said processor. The RAN node is operative to: receive a paging message; determine from restriction information received with the paging message which one or more RATs should be used to page the user equipment; and transmit the paging message to the UE via the one or more determined RATs.

According to another aspect, there is provided a user equipment, UE, for enabling the UE to be paged via an area spanning across first and second radio access technologies, RATs. The UE comprises a processor and a memory, said memory containing instructions executable by said processor. The UE is operative to signal capability information to a network node, the capability information indicating whether the UE is capable of connecting to the first RAT, second RAT, or both.

BRIEF DESCRIPTION OF THE DRAWINGS

For a better understanding of examples of the embodiments described herein, and to show more clearly how the examples may be carried into effect, reference will now be made, by way of example only, to the following drawings in which:

FIG. 6 shows an example of a method according to an embodiment;
FIG. 7*a* shows an example of a method according to an embodiment;
FIG. 7*b* shows an example of a method according to an embodiment.

DETAILED DESCRIPTION

Figure 1:
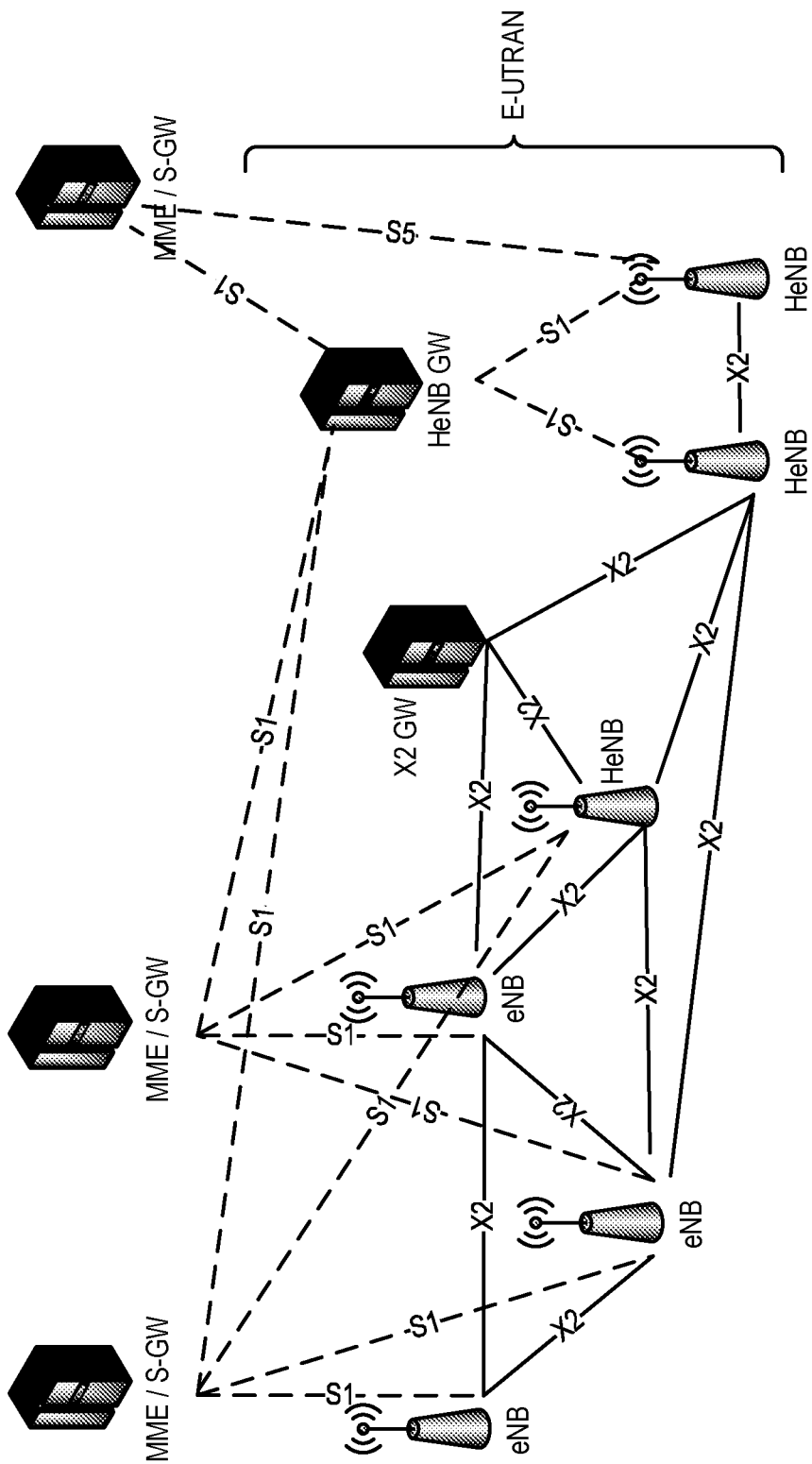
FIG. 1 shows an example of a LTE architecture.
Figure 2:
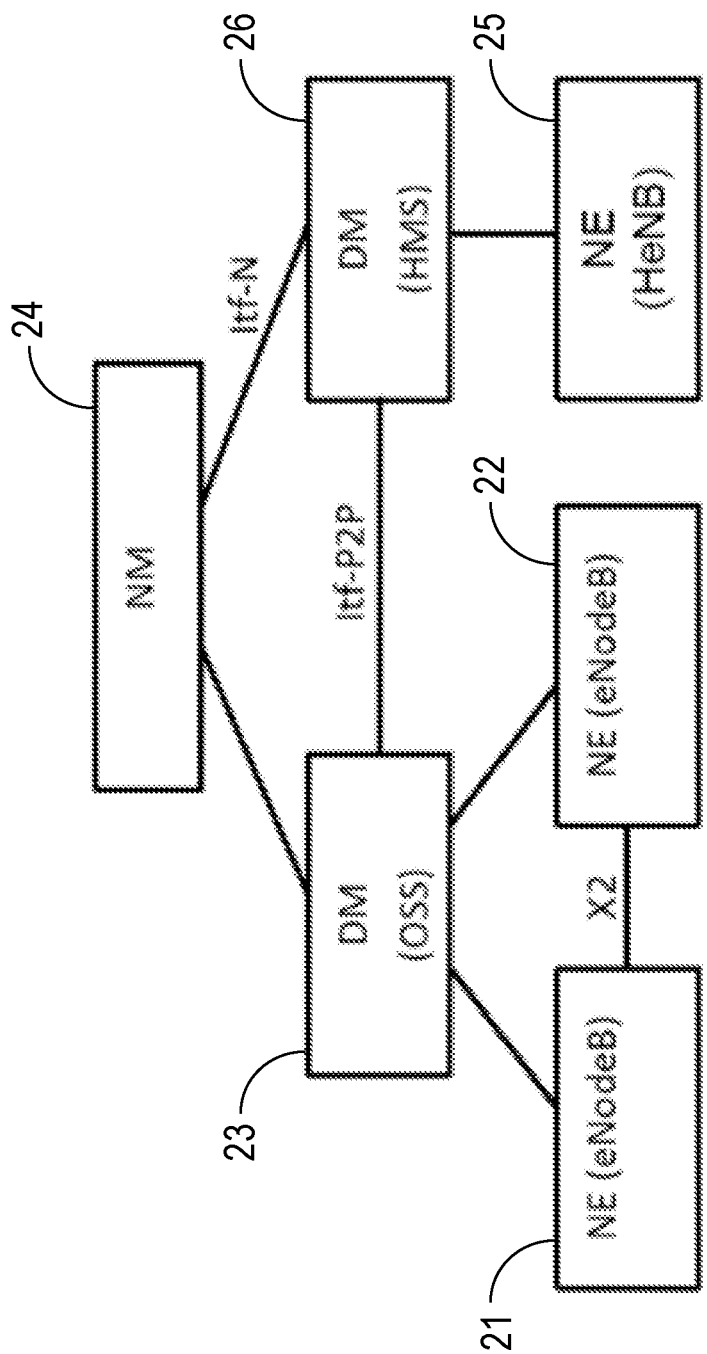
FIG. 2 shows an example of a management system.
Figure 3:
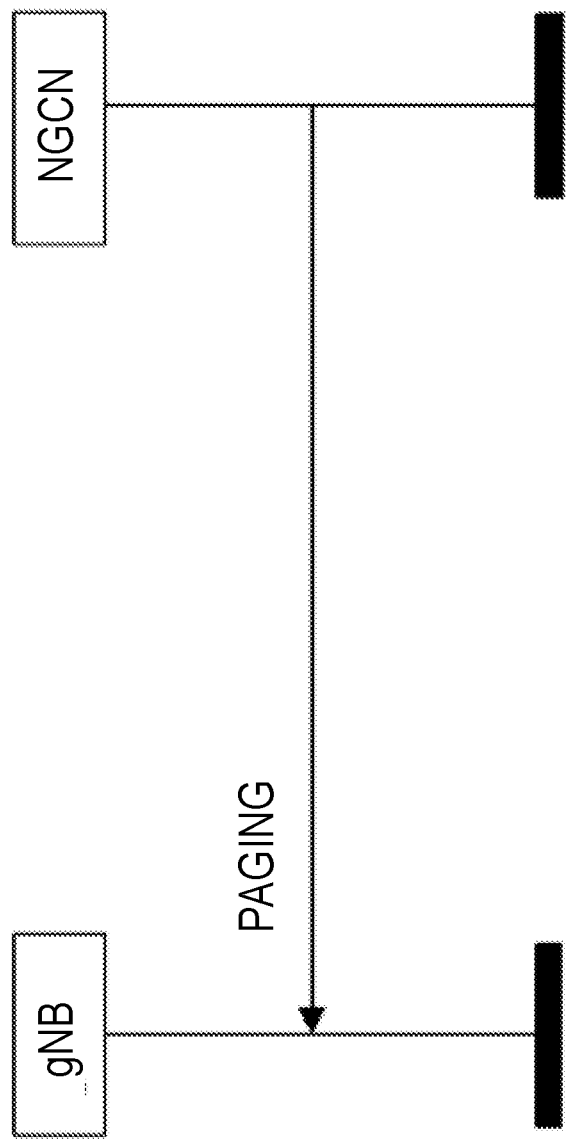
FIG. 3 shows an example of paging.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user. Instead, the term "terminal device" (and the alternative general terms set out above) encompasses any device that is capable of communicating with communication networks that operate according to one or more mobile communication standards, such as the Global System for Mobile communications, GSM, UMTS, Long-Term Evolution, LTE, 5th Generation Networks, etc. A UE may comprise a Universal Subscription Identity Module (USIM) on a smart-card or implemented directly in the UE, e.g., as software or as an integrated circuit. The operations described herein may be partly or fully implemented in the USIM or outside of the USIM.

According to an embodiment described herein, if a UE can either connect to only one Radio Access Technology, RAT, or a UE has the capabilities to support only one RAT, the embodiment pages the UE in the RAT where it can connect.

The present embodiments aim to therefore avoid unnecessary paging messages in RATs where the UE either cannot or is not capable of connecting.

In one embodiment a UE is registered to a UE Registration Area, RA, that includes Tracking Areas, TAs, spanning across first and second different types of Radio Access Technologies, RATs, e.g. spanning across both LTE and NR RATs. It is noted that, although embodiments described herein will be made in the context of Radio Access Technologies comprising LTE and NR, it is noted that any form of different RATs maybe used, including multiple different forms of RATs (not necessarily just first and second RATs).

A UE that is only capable to connect, for example, to one of such RATs (or to less RATs than are available) will signal UE capabilities to the Radio Access Network, RAN, that will reveal that the UE can connect to only one RAT (or fewer RATs than are available). It is noted that, if a tracking area spans across multiple different types of RATs, the UE may signal capabilities to the RAN that will reveal which RAT or RATs of the multiple RATs the UE can connect to.

In one example the RAN can forward such capabilities to the core network, CN, i.e. forward capability information relating to the UE. Alternatively the RAN can upon receiving the UE capabilities inform the CN in a separate Information Element or Message that the UE only supports one RAT (or particular RATs from multiple RATs).

In cases of Core Network, CN, based paging, where the CN may page the UE in the tracking areas, e.g. the entire Tracking Areas, TAs, forming the UE Registered Area, RA, of the UE, the CN may include in the paging message towards the RAN the capabilities of the UE. Such capabilities of the UE, e.g. conveyed as capability information, may be stored in the CN, and can be forwarded to the RAN, e.g. as part of the Paging message, in order to allow the RAN to understand if the UE is capable of supporting LTE or NR or both (or one or more of multiple RATs if there are a plurality of different RATs). With such information, according to one embodiment the RAN can be configured to not page the UE in RATs the UE is not capable of connecting to. In other words this means that the RAN only pages the UEs in cells belonging to the RATs that the UE support, thus avoiding unnecessary paging in RATs the UE does not support.

In another embodiment the UE may be able to connect to both LTE and NR but, due to, for example, subscription limitations, the UE can be served only by one technology. The latter means that the UE cannot connect to the RAT that is not included in its subscription plan.

In such situation the core network, CN, which is aware of the subscription details of a UE, shall include an indication, e.g. in the paging message, of the RAT within which the UE should be paged. This can allow RAN nodes to page the UE over the air only via RATs that the UE can connect to (e.g. able or allowed to connect to or communicate with).

In another embodiment, if the UE is paged via RAN paging, the RAN shall deduce from the UE RAT restriction information received from the CN whether the UE should be paged in both LTE and NR or only in one of these RATs. Such information may be the Handover Restriction List or new information sent by the CN to the RAN and specifying to which RAT the UE is allowed to connect.

When the RAN actually performs the RAN paging, according to one example it can inform other RAN nodes (e.g. with the Page Message over an interface, such as X2/Xx/Xn), which RATs the UE supports so that those other RAN nodes only need to page the UE in those RATs. The information about which RATs the UE support may also be used in the RAN when assigning RAN paging areas (e.g. using explicit cell lists) to the UE e.g. the RAN could only assign cells which the UE supports.

In another embodiment if the UE is paged via CN assisted paging, i.e. via a paging procedure requested to the CN by the RAN as a consequence of RAN paging not triggering any UE paging response, the CN can include an indication, e.g. in the paging message, of the RATs the UE should be paged in. Such indication may be deduced, for example, from the UE subscriber's information known to the CN.

The advantages of the methods described in the present embodiments are to enable minimization of over the air signaling when paging a UE, for example in Tracking Areas, TAs, that span across different Radio Access Technologies, RATs. Paging loads are amongst the highest contributors of signaling in a mobile network. Therefore, by reducing the amount of over the air signaling due to Paging, this enables radio resources to be saved, and a mobile network to be better dimensioned.

Figure 4:
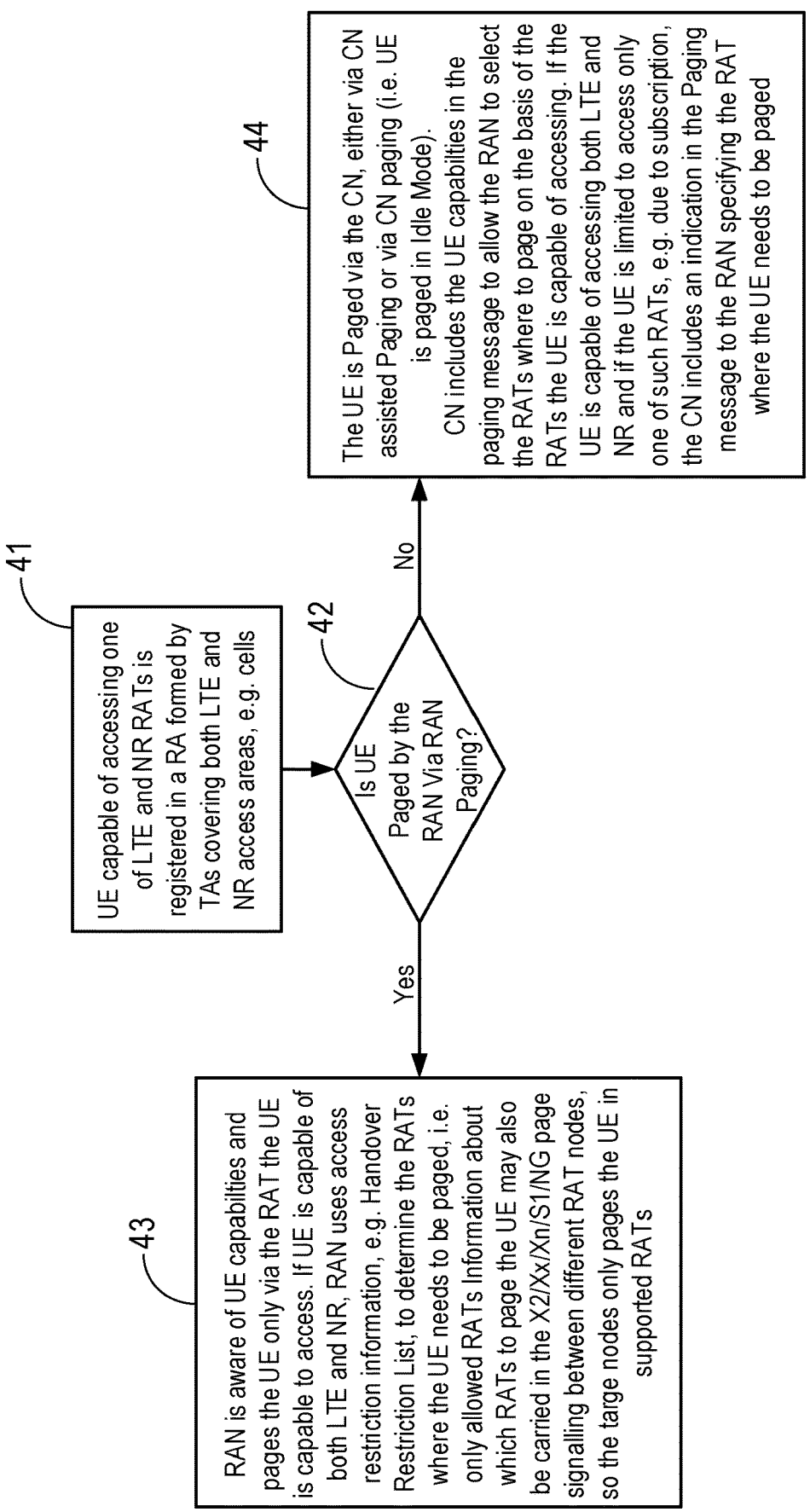
FIG. 4 shows an example of an embodiment.

FIG. 4 shows a block diagram of an embodiment.

In the block diagram in FIG. 4 it is explained how the paging procedure can be changed depending on the type of paging and UE conditions.

Box 41 shows that a UE is capable of accessing one of a plurality of Radio Access Technologies, RATs, for example one of LTE and NR. The fact that the UE is capable of accessing one of LTE and NR RATs may be registered, for example in a UE Registration Area, RA, formed by Tracking Areas, TAs, covering both LTE and NR access areas, e.g. cells.

Decision Box 42 decides whether a UE is paged by the Radio Access Network, RAN, via RAN paging.

If so, box 43 shows that, if the UE is paged via RAN paging and it is paged directly by the RAN, the RAN is aware of the UE capabilities and it can perform a filtering of the RATs where the UE should be paged based on that. Namely, the RAN can decide in which cells, LTE or NR, or both, the UE should be paged. If the UE is capable of connecting to both RATs, the RAN may use other information, such as access restriction information, for example a Handover Restriction List, HRL, to determine which RAT is forbidden for the UE and which RAT is allowed for access. Paging will therefore be performed in the RATs that are allowed to access. When the RAN performs the paging the initiated RAN node will typically page its own cells, but may also send a Page Message to other RAN nodes. This message could be sent, for example, over direct interfaces (e.g. X2, Xn, Xx) or via the Core Network, CN (e.g. via S1, NG interfaces). This message could include information about the supported RATs so that the target RAN node only need to page in the RAT the UE supports.

Box 44 shows examples of other paging cases, where the paging message towards the RAN is generated, for example, by the Core Network, CN. Box 44 of FIG. 4 shows first and second cases.

In a first case the Core Network, CN pages the UE as part of a CN assisted Paging procedure that follows RAN paging. In this case the CN may include in the Paging message towards the RAN the UE capability information to allow the RAN to understand which RATs the UE is capable to access and therefore where the UE should be paged.

In a second case the CN would page the UE directly, i.e. without the need of previous RAN paging. The CN in this case would be able to check the UE subscription details and whether the UE is limited to access only one RAT. The CN can therefore add an indication in the Paging message towards the RAN which specifies in which RAT the UE can be paged.

It is noted that, is some examples, both the UE capabilities and the RAT indication described above may be added together in the Paging message.

Alternatively, information can be added to the Paging message that can indicate the RAT in which the UE should be paged based on both UE capabilities and RAT restriction information. For this however, the CN would need to understand and process the UE capability information.

It is noted that, in the first case described above, the CN may also include in the Paging message an indication of the RAT where the UE should be paged based on RAT restriction information, for example stored as part of the UE subscription information.

The embodiments provide CN assistance of paging initiated by the RAN in a stateless manner.

The embodiments provide a method for minimization of over the air signaling when paging a UE in Tracking Areas, TAs, that span across different Radio Access Technologies, RATs.

Figure 5A:
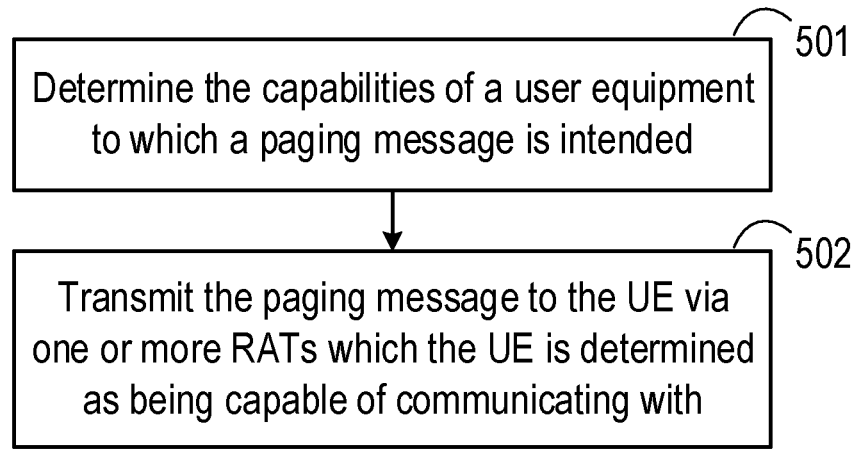
FIG. 5*a* shows an example of a method according to an embodiment.

FIG. 5a shows an example of a method according to an embodiment, for example performed in a radio access network, RAN, node, for paging user equipment in an area, for example a tracking area, spanning across a plurality of radio access technologies, RATs. The method comprises determining the capabilities of a user equipment to which a paging message is intended, step 501. The method comprises transmitting the paging message to the UE via one or more RATs which the UE is determined as being capable of communicating with, step 502.

When referring to being capable of communicating with, this embraces for example RATs which the UE is capable and/or allowed to connect with. The same applies to other embodiments.

In some examples, the step of determining the capabilities of the user equipment may be based on capability information already known to the RAN node. For example, the capability information may have been previously received from a user equipment.

In some examples the paging message is received from a core network node. In such examples, determining the capabilities of the user equipment may be based on capability information received with the paging message.

In some examples, the step of determining the capabilities of a user equipment comprises using access restriction information to determine which RATs a UE is able to communicate with. For example, the access restriction information may comprise a Handover Restriction List, or new information received from a core network.

In some examples, the step of transmitting the paging message may comprise transmitting the paging message directly to a UE via the one or more RATs the UE is determined as being capable of communicating or connecting with.

In other examples, the step of transmitting the paging message comprises transmitting the paging message to a UE via one or more other RAN nodes. In such examples, the paging message is transmitted to one or more other RAN nodes via an X2, Xn or XX interface, and/or whereby the paging message includes capability information relating to which RATs a UE is able to communicate or connect with.

In some examples, the step of transmitting the paging message comprises transmitting the paging message to a UE via one or more other RAN nodes, and via a core network, CN. In such examples the paging message may be transmitted to a core network via an S1 or NG interface.

Figure 5B:
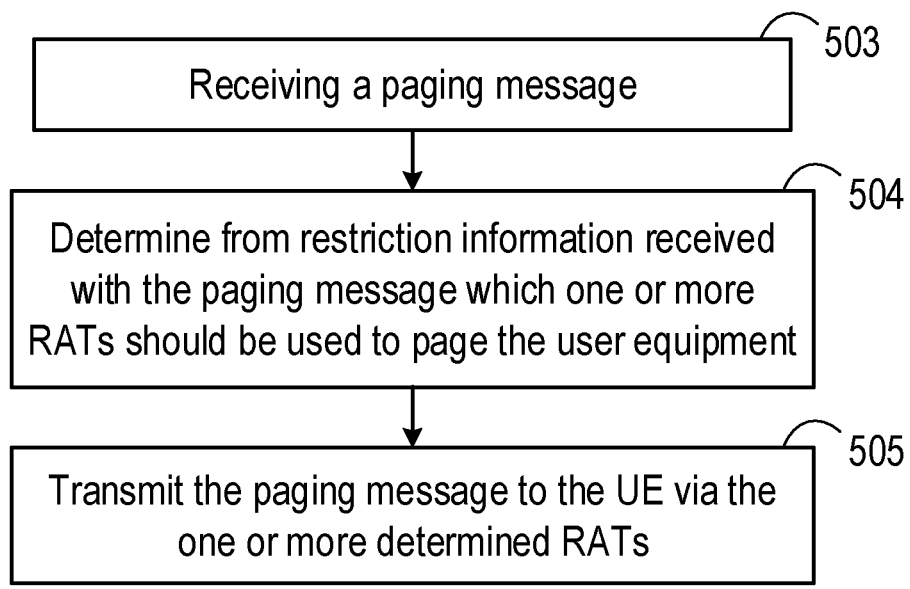
FIG. 5*b* shows an example of a method according to an embodiment.

FIG. 5b shows an example of a method according to another embodiment, for example performed in a radio access network, RAN, node, for paging user equipment in a tracking area spanning across a plurality of radio access technologies, RATs. The method comprises receiving a paging message, step 503. The method comprises determining from restriction information received with the paging message which one or more RATs should be used to page the user equipment, step 504. The method comprises transmitting the paging message to the UE via the one or more determined RATs, step 505.

The restriction information may comprise, for example, handover restriction list, HRL, information.

FIG. 6 shows an example of a method according to an embodiment, for example performed in a core network node for paging user equipment in an area, for example a tracking area, spanning across a plurality of radio access technologies. The method comprises sending a paging message to a radio access network, RAN, node for forwarding to a UE, wherein the paging message comprises capability information, wherein the capability information provides an indication of the capabilities of a UE for communicating with one or more of the plurality of radio access technologies, step 601.

In some examples, the capability information is stored in the core network node. For example, the capability information may be stored in the core network node in response to the core network node previously receiving the capability information from the UE. The capability information from a UE may be received, for example, via a radio access network, RAN, node.

In some examples, the capability information includes an indication of which RAT or RATs should be used to page the UE.

In some examples, the capability information includes RAT restriction information. For example, the RAT restriction information may relate to UE subscriber information.

In some examples, the step of sending a paging message comprises sending a paging message to one or more RAN nodes within a registration area of a UE, or within a set of tracking areas, TAs, a UE is registered for.

FIG. 7a shows an example of a method according to an embodiment, for example performed in a user equipment, for enabling the UE to be paged via an area, for example a tracking area, spanning across first and second radio access technologies, RATs. The method comprises signalling capability information to a network node, the capability information indicating whether the UE is capable of connecting to the first RAT, second RAT, or both, step 701.

The network node which the capability information is signalled to may comprise a network node which is adapted to send paging messages to the UE, for example a RAN node or CN node.

FIG. 7b shows an example of a method according to an embodiment, for example performed in a user equipment, for enabling the UE to be paged in a tracking area spanning across a plurality of radio access technologies, RATs. The method comprises signalling capability information to a network node, the capability information indicating which RATs of the plurality of RATs the UE is capable of connecting to.

The network node which the capability information is signalled to may comprise a network node which is adapted to send paging messages to the UE, for example a RAN node or CN node.

In some examples, the UE is registered to a UE registration area, RA, that comprises one or more tracking areas, TA, spanning across the first and second different types of RATs.

Figure 8:
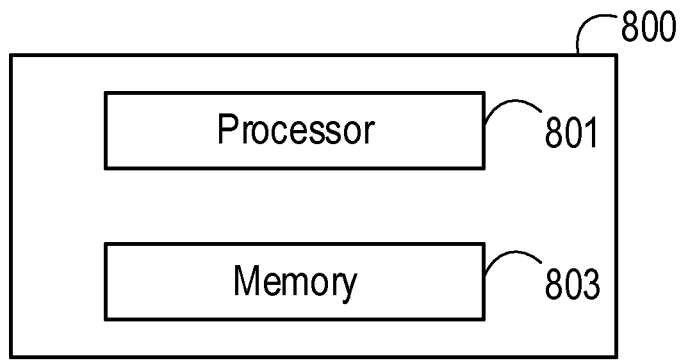
FIG. 8 shows an example of a radio access network, RAN, node according to an embodiment.

FIG. 8 shows an example of a radio access network, RAN, node 800 according to an embodiment, for paging user equipment in an area, e.g. a tracking area, spanning across a plurality of radio access technologies, RATs. The RAN node 800 comprises a processor 801 and a memory 803, said memory 803 containing instructions executable by said processor 801. The RAN node 800 is operative to determine the capabilities of a user equipment to which a paging message is intended. The RAN node 800 is operative to transmit the paging message to the UE via one or more RATs which the UE is determined as being capable of communicating with.

The RAN, node 800 may be further operative to perform the method as described in the embodiments herein, including for example as per any one of statements 2 to 12 described later.

According to another embodiment, FIG. 8 shows a radio access network, RAN, node 800 for paging user equipment in a tracking area spanning across a plurality of radio access technologies, RATs. The RAN node 800 comprises a processor 801 and a memory 803, said memory 803 containing instructions executable by said processor 801. The RAN node 800 is operative to receive a paging message, and determine from restriction information received with the paging message which one or more RATs should be used to page the user equipment. The RAN node 800 is operative to transmit the paging message to the UE via the one or more determined RATs.

The RAN node (800) may be further adapted to perform the method as described in the embodiments herein, including for example as per statement 14 described later.

Figure 9:
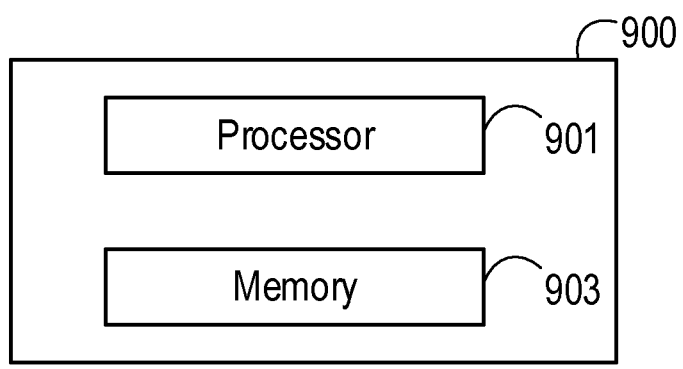
FIG. 9 shows an example of a core network node according to an embodiment.

FIG. 9 shows an example of a core network node 900 according to an embodiment, for paging user equipment in an area, e.g. a tracking area, spanning across a plurality of radio access technologies. The core network node 900 comprises a processor 901 and a memory 903, said memory 903 containing instructions executable by said processor 901. The core network node 900 is operative to send a paging message to a radio access network, RAN, node for forwarding to a UE, wherein the paging message comprises capability information, wherein the capability information provides an indication of the capabilities of a UE for communicating with one or more of the plurality of radio access technologies.

The core network node 900 may be further operative to perform the method as described in the embodiments herein, including for example as per any one of statements 16 to 22 described later.

Figure 10:
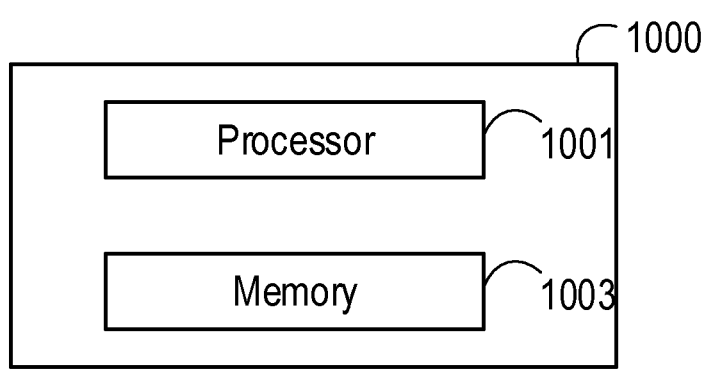
FIG. 10 shows an example of a user equipment according to an embodiment.

FIG. 10 shows an example of a user equipment, UE, 1000 according to an embodiment, for enabling the UE to be paged via an area, e.g. a tracking area, spanning across first and second radio access technologies, RATs. The UE 1000 comprises a processor 1001 and a memory 1003, said memory 1003 containing instructions executable by said processor 1001. The UE 1000 is operative to signal capability information to a network node, the capability information indicating whether the UE is capable of connecting to the first RAT, second RAT, or both.

According to another embodiment, FIG. 10 shows a user equipment, UE, 1000 for enabling the UE to be paged in a tracking area spanning across a plurality of radio access technologies, RATs. The UE 1000 comprises a processor 1001 and a memory 1003, said memory 1003 containing instructions executable by said processor 1001, whereby said UE 1000 is operative to signal capability information to a network node, the capability information indicating which RATs of the plurality of RATs the UE is capable of connecting to.

Statements

For the avoidance of doubt, embodiments are described herein which relate to the following defined statements.

Statement 1. A method in a radio access network, RAN, node for paging user equipment in an area spanning across a plurality of radio access technologies, RATs, the method comprising:

determining the capabilities of a user equipment to which a paging message is intended; and transmitting the paging message to the UE via one or more RATs which the UE is determined as being capable of communicating with.

Statement 2. A method as in statement 1, wherein determining the capabilities of the user equipment is based on capability information already known to the RAN node.

Statement 3. A method as in statement 2, wherein the capability information has been previously received from a user equipment.

Statement 4. A method as in statement 1, wherein the paging message is received from a core network node.

Statement 5. A method as in statement 4, wherein determining the capabilities of the user equipment is based on capability information received with the paging message.

Statement 6. A method as in any one of statements 1 to 5, wherein determining the capabilities of a user equipment comprises using access restriction information to determine which RATs a UE is able to communicate with.

Statement 7. A method as in statement 6, wherein the access restriction information comprises a Handover Restriction List, or new information received from a core network.

Statement 8. A method as in any one of statements 1 to 7, wherein transmitting the paging message comprises transmitting the paging message directly to a UE via the one or more RATs the UE is determined as being capable of communicating or connecting with.

Statement 9. A method as in any one of statements 1 to 7, wherein transmitting the paging message comprises transmitting the paging message to a UE via one or more other RAN nodes.

Statement 10. A method as in statement 9, wherein the paging message is transmitted to one or more other RAN nodes via an X2, Xn or XX interface, and/or whereby the paging message includes capability information relating to which RATs a UE is able to communicate or connect with.

Statement 11. A method as in any one of statements 1 to 7, wherein transmitting the paging message comprises transmitting the paging message to a UE via one or more other RAN nodes, and via a core network, CN.

Statement 12. A method as in statement 11, wherein the paging message is transmitted via a core network via an S1 or NG interface to one or more other RAN nodes, and/or whereby the paging message includes capability information relating to which RATs a UE is able to communicate or connect with.

Statement 13. A method in a radio access network, RAN, node for paging user equipment in a tracking area spanning across a plurality of radio access technologies, RATs, the method comprising:
  receiving a paging message;
  determining from restriction information received with the paging message which one or more RATs should be used to page the user equipment; and
  transmitting the paging message to the UE via the one or more determined RATs.

Statement 14. A method as in statement 13, wherein the restriction information comprises handover restriction list, HRL, information.

Statement 15. A method in a core network node for paging user equipment in an area spanning across a plurality of radio access technologies, the method comprising:
  sending a paging message to a radio access network, RAN, node for forwarding to a UE, wherein the paging message comprises capability information, wherein the capability information provides an indication of the capabilities of a UE for communicating with one or more of the plurality of radio access technologies.

Statement 16 A method as in statement 15, wherein the capability information is stored in the core network node.

Statement 17. A method as in statement 16, wherein the capability information is stored in the core network node in response to the core network node previously receiving the capability information from the UE.

Statement 18. A method as in statement 17, wherein the capability information from a UE is received via a radio access network, RAN, node.

Statement 19. A method as in any one of statements 15 to 18, wherein the capability information includes an indication of which RAT or RATs should be used to page the UE.

Statement 20. A method as in any one of statements 15 to 19, wherein the capability information includes RAT restriction information.

Statement 21. A method as in statement 20, wherein the RAT restriction information relates to UE subscriber information.

Statement 22. A method as in any one of statements 15 to 21, wherein sending a paging message comprises sending a paging message to one or more RAN nodes within a registration area of a UE, or within a set of tracking areas, TAs, a UE is registered for.

Statement 23. A method in a user equipment, UE, for enabling the UE to be paged via an area spanning across first and second radio access technologies, RATs, the method comprising:
  signalling capability information to a network node, the capability information indicating whether the UE is capable of connecting to the first RAT, second RAT, or both.

Statement 24. A method in a user equipment, UE, for enabling the UE to be paged in a tracking area spanning across a plurality of radio access technologies, RATs, the method comprising:
  signalling capability information to a network node, the capability information indicating which RATs of the plurality of RATs the UE is capable of connecting to.

Statement 25. A method as in statement 24, wherein the UE is registered to a UE registration area, RA, that comprises one or more tracking areas, TA, spanning across the first and second different types of RATs.

Statement 26. A radio access network, RAN, node for paging user equipment in an area spanning across a plurality of radio access technologies, RATs, the RAN node being adapted to:
  determine the capabilities of a user equipment to which a paging message is intended; and
  transmit the paging message to the UE via one or more RATs which the UE is determined as being capable of communicating with.

Statement 27. A radio access network, RAN, node as in statement 26, wherein the RAN node is adapted to perform the method as per any one of statements 2 to 12.

Statement 28. A radio access network, RAN, node for paging user equipment in a tracking area spanning across a plurality of radio access technologies, RATs, the RAN node being adapted to:
  receive a paging message;
  determine from restriction information received with the paging message which one or more RATs should be used to page the user equipment; and
  transmit the paging message to the UE via the one or more determined RATs.

Statement 29. A radio access network, RAN, node as in statement 26, wherein the RAN node is adapted to perform the method as per statements 14.

Statement 30. A core network node for paging user equipment in an area spanning across a plurality of radio access technologies, the core network node being adapted to:
  send a paging message to a radio access network, RAN, node for forwarding to a UE, wherein the paging message comprises capability information, wherein the capability information provides an indication of the capabilities of a UE for communicating with one or more of the plurality of radio access technologies.

Statement 31. A core network node as in statement 30, wherein the core network node is adapted to perform the method as per any one of statements 16 to 22.

Statement 32. A user equipment, UE, for enabling the UE to be paged via an area spanning across first and second radio access technologies, RATs, the UE being adapted to:
  signal capability information to a network node, the capability information indicating whether the UE is capable of connecting to the first RAT, second RAT, or both.

Statement 33. A user equipment, UE, for enabling the UE to be paged in a tracking area spanning across a plurality of radio access technologies, RATs, the UE being adapted to:
  signal capability information to a network node, the capability information indicating which RATs of the plurality of RATs the UE is capable of connecting to.

Statement 34. A radio access network, RAN, node (800) for paging user equipment in an area spanning across a plurality of radio access technologies, RATs, the RAN node (800) comprising a processor (801) and a memory (803), said memory (803) containing instructions executable by said processor (801), whereby said RAN node (800) is operative to:
  determine the capabilities of a user equipment to which a paging message is intended; and
  transmit the paging message to the UE via one or more RATs which the UE is determined as being capable of communicating with.

Statement 35. A radio access network, RAN, node (800) as in statement 34, wherein the RAN node (800) is operative to perform the method as per any one of statements 2 to 12.

Statement 36. A radio access network, RAN, node (800) for paging user equipment in a tracking area spanning across a plurality of radio access technologies, RATs, the RAN node (800) comprising a processor (801) and a memory (803), said memory (803) containing instructions executable by said processor (801), whereby said RAN node (800) is operative to:
  receive a paging message;
  determine from restriction information received with the paging message which one or more RATs should be used to page the user equipment; and
  transmit the paging message to the UE via the one or more determined RATs.

Statement 37. A radio access network, RAN, node (800) as in statement 36, wherein the RAN node is adapted to perform the method as per statement 14.

Statement 38. A core network node (900) for paging user equipment in an area spanning across a plurality of radio access technologies, the core network node (900) comprising a processor (901) and a memory (903), said memory (903) containing instructions executable by said processor (901), whereby said core network node (900) is operative to:
  send a paging message to a radio access network, RAN, node for forwarding to a UE, wherein the paging message comprises capability information, wherein the capability information provides an indication of the capabilities of a UE for communicating with one or more of the plurality of radio access technologies.

Statement 39. A core network node as in statement 38, wherein the core network node (900) is operative to perform the method as per any one of statements 16 to 22.

Statement 40. A user equipment, UE, (1000) for enabling the UE to be paged via an area spanning across first and second radio access technologies, RATs, the UE (1000) comprising a processor (1001) and a memory (1003), said memory (1003) containing instructions executable by said processor (1001), whereby said UE (1000) is operative to:
  signal capability information to a network node, the capability information indicating whether the UE is capable of connecting to the first RAT, second RAT, or both.

Statement 41. A user equipment, UE, (1000) for enabling the UE to be paged in a tracking area spanning across a plurality of radio access technologies, RATs, the UE (1000) comprising a processor (1001) and a memory (1003), said memory (1003) containing instructions executable by said processor (1001), whereby said UE (1000) is operative to:
  signal capability information to a network node, the capability information indicating which RATs of the plurality of RATs the UE is capable of connecting to.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for paging a user equipment (UE) in an area spanning across a plurality of radio access technologies (RATs), the method comprising:
  obtaining capability information of the UE, for which a paging message is intended, from previously stored information in the UE or a core network (CN);
  receiving access restriction information from the CN, wherein the access restriction information comprises at least one of a handover restriction list or new information;
  determining, in a radio access network (RAN) node configured to transmit paging messages over the air via one or more RATs, the one or more RATs with which the UE is capable of communicating based on the received access restriction information; and
  transmitting the paging message to the UE via each of the one or more RATs, which the UE is determined as being capable of communicating with, after reception of User Plane (UP) traffic at the RAN node for the UE while the UE is in RRC Inactive state.

2. The method of claim 1, wherein the determining based on the capability information for the UE is already known to the RAN node.

3. The method of claim 1, wherein the paging message is received from a core network node.

4. The method of claim 3, wherein the determining based on the capability information for the UE is received with the paging message.

5. The method of claim 1, wherein transmitting the paging message comprises at least one of:
  transmitting the paging message directly to the UE via the one or more RATs the UE is determined as being capable of communicating or connecting with;
  transmitting the paging message to the UE via one or more other RAN nodes; and
  transmitting the paging message to the UE via one or more other RAN nodes and via the CN.

6. A method in a core network node for paging in an area spanning across a plurality of radio access technologies (RATs), the method comprising:
sending a paging message to a radio access network (RAN) node for forwarding to a UE, the RAN node being configured to transmit paging messages over the air via one or more RATs, wherein the paging message comprises capability information, wherein the capability information provides an indication of whether the UE is able to communicate with cells of a first RAT and whether the UE is able to communicate with cells of a second RAT, the first and second RATs each being a cellular mobile communications network RAT, wherein sending the paging message comprises sending the paging message to one or more RAN nodes within a registration area of the UE or within a set of tracking areas (TAs), the UE is registered for.

7. The method of claim 6, wherein:
the capability information is stored in the core network node; or
the capability information is stored in the core network node in response to the core network node previously receiving the capability information from the UE; or
the capability information is stored in the core network node in response to the core network node previously receiving the capability information from the UE, and
wherein the capability information from the UE is received via the one or more RAN nodes.

8. A method in a user equipment (UE) for enabling the UE to be paged via an area spanning across a first radio access technologies (RAT) and a second RAT, the method comprising:
signalling capability information to a network node, the capability information indicating whether the UE is capable of connecting to the first RAT, second RAT, or both, the first and second RATs each being a cellular mobile communications network RAT, wherein, in an event a tracking area spans across different types of RATs, the capability information is signaled to a Radio Access Network (RAN) to reveal the number of RATs to which it is intended to connect.

9. The method of claim 8, wherein the UE is registered to a UE registration area (RA) that comprises one or more tracking areas (TA) spanning across the different types of RATs.

10. A radio access network (RAN) node for paging a user equipment (UE) in an area spanning across a plurality of radio access technologies (RATs), the RAN node comprising:
a processor and a memory, the memory containing instructions executable by the processor, whereby the RAN node is operative to:
obtain capability information of the UE, for which a paging message is intended, from previously stored information in the UE or a core network (CN);
receive access restriction information from the CN, wherein the access restriction information comprises at least one of a handover restriction list or new information;
determine one or more RATs with which the UE is capable of communicating based on the received access restriction information; and
transmit the paging message to the UE via each of the one or more RATs which the UE is determined as being capable of communicating with, the RAN node is configured to transmit paging messages over the air via one or more RATs, after reception of User Plane (UP) traffic at the RAN node for the UE while the UE is in RRC Inactive state.

11. The RAN node of claim 10, wherein the RAN node is operative to determine the capabilities of the UE based on capability information already known to the RAN node.

12. The RAN node of claim 10, wherein the RAN node is operative to receive the paging message from a core network node.

13. The RAN node of claim 12, wherein the RAN node is operative to determine the one or more RATs with which the UE is capable of communicating based on the capability information received with the paging message.

14. A core network node for paging a user equipment (UE) in an area spanning across a plurality of radio access technologies (RATs), the core network node comprising a processor and a memory, the memory containing instructions executable by the processor, wherein the core network node is operative to:
send a paging message to a radio access network (RAN) node for forwarding to the UE, the RAN node is configured to transmit paging messages over the air via one or more RATs, wherein the paging message comprises capability information, and the capability information provides an indication of whether the UE is able to communicate with cells of a first RAT and whether the UE is able to communicate with cells of a second RAT, the first and second RATs each being a cellular mobile communications network RAT, wherein sending the paging message comprises sending the paging message to one or more RAN nodes within a registration area of the UE or within a set of tracking areas (TAs), the UE is registered for.

15. The core network node of claim 14, wherein:
the capability information is stored in the core network node; or
the capability information is stored in the core network node in response to the core network node previously receiving the capability information from the UE; or
the capability information is stored in the core network node in response to the core network node previously receiving the capability information from the UE, and wherein the capability information from the UE is received via a radio access network.

16. A user equipment (UE) for enabling the UE to be paged via an area spanning across a first radio access technologies (RAT) and a second RAT, the UE comprising a processor and a memory, the memory containing instructions executable by the processor, wherein the UE is operative to:
signal capability information to a network node, the capability information indicating whether the UE is capable of connecting to the first RAT, second RAT, or both, the first and second RATs each being a cellular mobile communications network RAT, wherein, in an event a tracking area spans across different types of RATs, the capability information is signaled to a Radio Access Network (RAN) to reveal the number of RATs to which it is intended to connect.

* * * * *